United States Patent [19]

Spielberger

[11] Patent Number: 5,005,926
[45] Date of Patent: Apr. 9, 1991

[54] BALLISTIC PROTECTIVE LASER SHIELD

[75] Inventor: Seymour Spielberger, Stamford, Conn.

[73] Assignee: Barnes Engineering Company, Shelton, Conn.

[21] Appl. No.: 259,168

[22] Filed: Oct. 18, 1988

[51] Int. Cl.$^5$ .......................... G02B 5/22; G02B 5/28
[52] U.S. Cl. ..................................... 350/1.1; 350/166
[58] Field of Search .......... 350/311, 166, 164, 162.12, 350/1.1; 2/2.5

[56] References Cited

U.S. PATENT DOCUMENTS

| | | | |
|---|---|---|---|
| 3,707,004 | 12/1972 | Kapitan et al. | 2/2.5 |
| 3,853,783 | 12/1974 | Tucker | 252/300 |
| 4,622,174 | 11/1986 | McKoy et al. | 252/582 |
| 4,657,345 | 4/1987 | Gordon | 350/311 |

Primary Examiner—Bruce Y. Arnold
Assistant Examiner—Tho Van Tran
Attorney, Agent, or Firm—Parmelee, Bollinger & Bramblett

[57] ABSTRACT

An interference filter is deposited on a high temperature transparent plastic film which passes normal incident radiation below 694 nm and reflects other wavelengths out to 1064 nm regardless of the angle of incidence of the laser radiation applied thereto. The interference filter is optically bonded directly onto a ballistic protective plastic substrate which transmits visible radiation thereby providing a laser shield having ballistic properties as well as laser radiation rejection properties. The ballistic protective plastic substrate may also contain absorbing dyes for absorbing laser radiation in the region of high sensitivity of 400 to 700 nm. The interference filter is then optically bonded directly onto the transparent ballistic protective plastic substrate thereby providing a protective laser shield having ballistic protection properties as well as hybrid filter properties both absorbing and reflecting laser radiation. The absorption dyes are incorporated in the transparent ballistic protective plastic substrate, such as polycarbonate, prior to the bonding of the interference filter onto the substrate. The protective laser shield can be incorporated in lenses, protective eyeware, windows etc. for protecting the view from laser radiation.

7 Claims, 1 Drawing Sheet

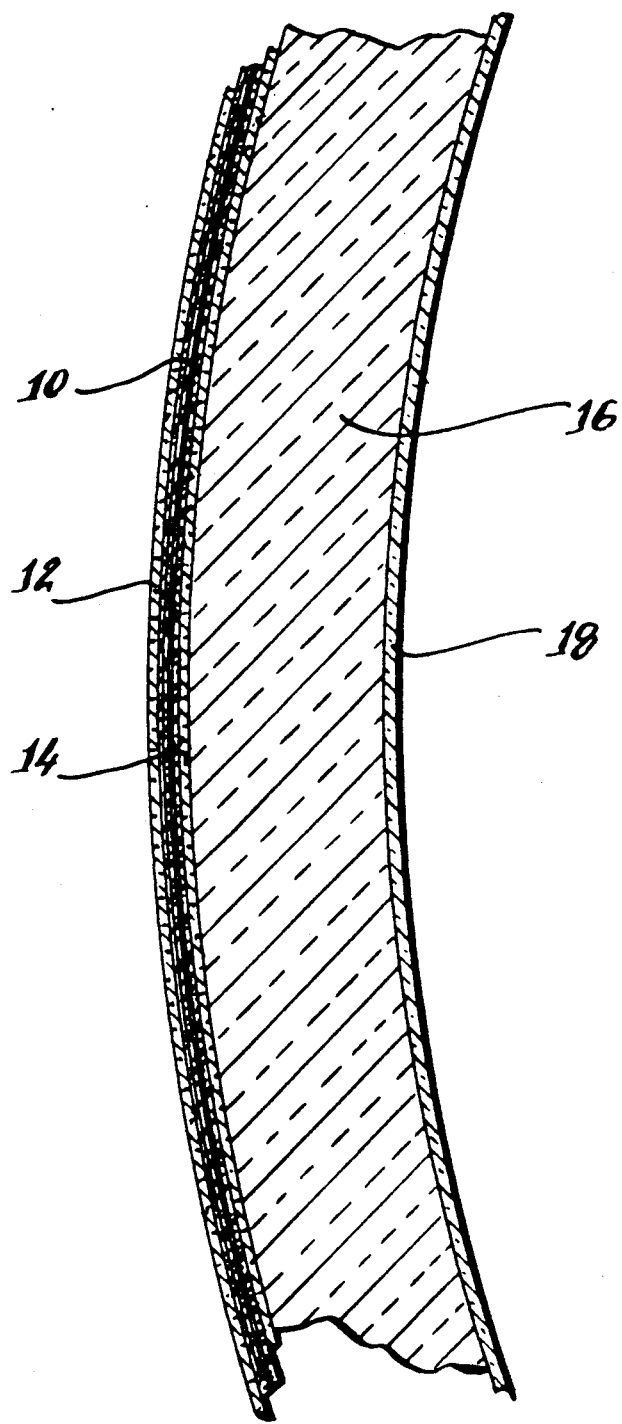

BALLISTIC PROTECTIVE LASER SHIELD

BACKGROUND OF THE INVENTION

This invention relates to a transparent protective laser shield and the method of making the same which is adapted to be interposed between a laser and a viewer for protecting the viewer from damage by laser beam radiation, and more particularly to such protective laser shield in which an interference filter is bonded directly onto a ballistic protective substrate which may incorporate absorption dyes thereby providing a protective laser shield having ballistic protection properties as well as laser radiation rejection properties.

There has been a proliferation of laser use in medical, industrial, space and military applications in which a laser beam is employed for cutting, fusing, or performing other functions which may cause contact with the eye either by direct viewing or reflection from the objects to which the laser beam is applied. The eye collects and focuses the energy, and since the laser beam is generally concentrated, considerable damage can result from the application of this energy to the optic nerve. The same is true when that viewer happens to be a light sensitive detector which may be monitoring or viewing the particular operation or system in which the laser beam is operating. Accordingly, laser shields have been provided to enable viewing the laser beam in its environment without being subjected to the danger of concentrated laser beam energy.

U.S. Pat. No. 3,853,783 describes the use of vanadyl phthalocyanine sulfonides in plastic compositions to protect the eyes from exposure to laser radiation in the region of about 620 to 720 nm. U.S. Pat. No. 4,657,345 which is assigned to the assignee of the present invention, a laser shield is provided by diffusing a particular absorption dye into a transparent plastic substrate which absorbs radiation of interest. In U.S. Pat. No. 4,622,174 which is assigned to the assignee of the present invention absorption dyes are provided in an optical laser shield which absorb narrow band wavelengths which can be adjusted to coincide with the selective wavelengths of the laser beams which are desired to be protected against.

Interference filters comprising multiple thin films of one quarter wavelength stacks of alternating high and low dielectric materials have been available for many years and are characterized as being highly flexible optical components permitting precision design location of filter wavelengths with maximum inband transmission. These interference filters are normally deposited onto glass or other transmitting stable materials which can retain their structure during evaporation or sputtering of the films onto the substrate at elevated temperatures. They are designed to reflect specific wavelengths or spectral bands and are therefore useful for protecting the eye or viewer against lasers. However, because the thin film thickness is designed to bear a one quarter wavelength (or other factor) relationship to the wavelength of interest, the filter will respond differently to laser rays entering the filter at off normal incidence. As the path lengths through the layers of dielectric materials increase due to a greater angle of incidence, there is a shift of the filter response to shorter wavelengths. Since the interference filters of interest are designed to reflect incident laser radiation at specific wavelengths, the laser blocking wavelength would then be shifted to a wavelength where it would not be useful in providing protection. Thus, the interference filter because of its deposition at high temperatures and its change of response at off axis incidence provides some problems for use as a laser shield. In addition, these are delicate filters and would provide no ballistic protection from flying objects to the viewer. The high energy levels employed in lasers as well as the nature of the systems in which they are incorporated makes it advisable to provide ballistic protection in laser shield.

SUMMARY OF THE INVENTION

Accordingly, it is an object of this invention to provide a new and improved protective laser shield having ballistic protection properties as well as laser radiation rejection properties.

A further object of this invention is to provide a new and improved protective laser shield which permits the use of interference filters in a laser shield which protects laser radiation in the 694 to 1064 nanometer range with considerably enhanced optical transmission performance over absorption type filters.

Still a further object of this invention is to provide a laser shield which reflects laser energy in a predetermined range and absorbs laser radiation in the visible region while still providing usable transmission in the visible region.

A further object of this invention is to provide a new and improved laser shield utilizing both interference and absorption type filters with no significant visual transmission penalties from the combined use.

In carrying out this invention in one illustrative embodiment thereof, a ballistic transparent protective laser shield is provided for transmitting visible radiation while absorbing and reflecting predetermined laser radiation. A transparent ballistic protective substrate is provided for transmitting visible radiation. An interference filter is deposited on a high temperature transparent plastic film which passes normal incident radiation below 694 nm and reflects other wavelengths up to 1064 nm regardless of the angle of incidence of the laser radiation applied. The high temperature transparent plastic film containing the interference filter is optically bonded using an optical transparent bonding means directly onto the transparent ballistic protective plastic substrate thereby providing a protective laser shield having ballistic protection properties as well as laser radiation rejection properties. The ballistic protective plastic substrate is preferably polycarbonate which in one embodiment has at least one absorbing dye incorporated therein for absorbing laser radiation in the region of high eye sensitivity from 400 to 700 nm.

BRIEF DESCRIPTION OF THE DRAWING

The invention, together with further aspects, objects, features and advantages thereof will be more clearly understood from the following description taken in conjunction with the accompanying drawing which illustrates a partial cross-sectional view of the ballistic protective laser shield in accordance with the present invention.

DESCRIPTION OF THE PREFERRED EMBODIMENTS

In the description of the present invention the term "laser shield" would apply to any device interposed between the viewer and the laser beam being monitored or viewed. Such device may take the form of a shield, window, visor, spectacle or other occular component. Since the eye at visible and near infrared red wavelengths will focus or concentrate laser energy which is already concentrated there is a tremendous risk of eye damage in viewing a laser system. Since optical systems which collect and reflect the energy applied to sensitive detectors or camera tubes provide the same result the viewer thus may either be the human eye or any of the various forms of radiation sensitive detectors which may view the laser radiation either by choice or otherwise.

As pointed out above, interference filters comprise multiple thin films of one quarter wavelength stacks of alternating high and low dielectric materials which are designed to reflect specific wavelengths and have maximum inband transmission. Since the filters respond differently to laser rays entering the filter at off axis incidence and the path lengths through the layers of dielectric materials increase due to this greater angle of incidence, there is a shift of the filter response to shorter wavelengths. The laser blocking wavelengths could be shifted to a wavelength where it would not be useful in providing protection. However, in accordance with the present invention it has been found that for the unique case of wavelengths of 694 nm or longer out to 1064 nm, an interference filter can be provided which has a low pass characteristic i.e., passing normal incident radiation below 694 nm and reflecting almost all others regardless of the angle of incidence out to approximately 1064 nm. In this restricted case, the effect of irradiating the filter off normal incidence only spectrally broadens its reflecting characteristics to slightly shorter than 694 nm, but retains the essential 694 nm reflection. Accordingly, it is apparent that an interference filter which reflects laser energy with the characteristics described above could provide an effective protection against laser eye damage or viewer damage at 694 and 1094 nm. Such an interference filter is made by Optical Coating Laboratories, Inc. of Santa Rosa, Calif. However, as discussed previously, interference filters are generally applied to glass or other hard brittle materials and as such would probably not be useful for eyeware that is required to provide ballistic protection because the filter may be prone to shattering. Accordingly, the interference filter portion of the present invention is deposited on a higher temperature transparent plastic film such as Mylar® which is a polyester resin produced by the DuPont Co.

Referring now to the drawings, a multi-layer interference filter 10 is deposited on a polyester film of 0.05 to 0.12 mm thick, for example, Mylar referred to above. The film 12 may be first thermally formed by conventional thermal forming techniques into a preform of the occular device for which it is intended whether flat, singly or a doubly curved substrate or it may be directly used without forming if the substrate is flat or singly curved. The various layers of the multi-layer interference filter are then deposited on the transparent plastic film 12 to form the interference filter 10. The film 12 carrying the interference filter 10 is then bonded or laminated by an optically transparent adhesive cement or equivalent 14 to a transparent ballistic protective plastic substrate 16, for example a 2 mm thick polycarbonate substrate. The transparent ballistic protective substrate 16 has been formed as a visor, eyeshield, spectacle, goggle, window or other occular component with the preformed polyester film 12 having a complementary configuration such that when they are optically bonded both the interference filter and the plastic substrate will have the configuration desired. The inner surface of the polycarbonate substrate 16 may be provided with a hard, transparent optical coating 18 to prevent scratching or damage to the substrate 16. As an example, the hard coating 18 may be provided by a silicone primer such as GE SHP-200 and a silicated based hard coat e.g. GE SHC-1200. The typical thickness of the hard coat is 20–100 microns.

The lamination process whereby interference filter 10 deposited onto plastic film 12 can be bonded to the transparent ballistic protective plastic substrate 16 can be done using several techniques. The optical bonding means 14 may comprise a Scotch Brand 2 MIL high performance laminating adhesive/double lined material made by 3 M of St. Paul, Minn. for use with flat and singly curved eyeware substrates. The material consists of a layer of adhesive which is surfaced on both sides with a 0.001 inch non-sticking protective plastic film. The film from one surface is removed, and with the adhesive exposed rolled onto the substrate 16 between double rollers which are facing each other. Similarly the interference filter coated plastic film 12 is rolled onto the second exposed surface of the laminating adhesive for bonding the two together.

Other methods of lamination may also be used, for example, may employ a liquid adhesive such as NOA type 68, Norlin Optical Adhesive, made by Norlin Products Inc. of New Brunswick, N.J. or Permabond 102, made by Permabond International, of Englewood, N.J. which can be spread over the surface of the substrate 16. The interference film 10 is then applied and held in intimate (pressure) contact during a thermal cure cycle. For doubly curved substrates, a preform of the polyester film is interference coated, and then laminated to the final substrate. This process requires the application and use of a liquid adhesive.

As pointed out, interference filters all shift their characteristics toward shorter wavelengths as the angle of incidence increases from the normal. Thus, a narrow band rejection filter used for laser protection may shift completely off the laser line at large angles of incidence and lose all protective capability. This can be prevented by making a rejection band wider, but this reduces the useful transmission. This is no problem for wavelengths outside the visible range, since the rejection band can be made wide without any loss of useful transmission.

The ruby laser at 694 and the neodymium yag laser at 1064 nm provide a concern for certain applications. The sensitivity of the eye extends from 400 to 700 nm but peaks around 550 nm. The eye sensitivity at 694 nm is quite low, therefore if a short pass filter cutoff at about 690 nm is used to reflect both of these lines, the spectral shift due to incident angle would cause little loss in visibility.

In the spectral region of high sensitivity, it is undesirable to broaden the rejection band of interference filters to compensate for incidence angle. It is more efficient to use narrow band absorbing dyes which are not angle sensitive. Accordingly, another aspect of this application is to provide a hybrid laser shield using a short pass interference filter to block the 694 nm and 1064 nm spectral lines and narrow band absorbing dyes to block laser lines in the region of high sensitivity. By combining the two types of filters, interference and absorption to form a hybrid filter, considerably enhanced optical performance is possible. For example, interference filters of the type noted above for the 694 to 1064 nm range have approximately 90% transmission in the visible spectrum compared with approximately 45% for absorption filters. If absorption filters were used to provide laser protection at e.g. three laser wavelengths, depending on the wavelengths and optical density selected, the hybrid filter could have about twice the visible transmission of the absorption filter.

In fabricating the hybrid filter to form the laser shield in accordance with this aspect of the invention, the laser protection absorption dye is incorporated in the transparent ballistic protective plastic substrate 16 prior to lamination or bonding with the interference filter 10. The absorption dye can be molded into the plastic substrate 16 if the dye thermal compatability permits, or diffused into the surface of the plastic substrate 16 using the method described in U.S. Pat. No. 4,657,345, which is assigned to the assignee of the present invention. An example of a laser absorbing dye which may be incorporated into the polycarbonate substrate 16 to absorb laser lines in the region of high sensitivity for example, absorbing the double YAG laser at 532 nm would be platinum octaethylporphyrin. A combination of dyes may be used for absorbing a plurality of different laser lines which may occur in the visible region. Such use will be limited by the restriction of transmission in the visible region.

By depositing the interference filter on a high temperature plastic substrate and either bonding or laminating the interference filter which reflects certain specific laser lines and transmits the visible portion of the spectrum to a ballistic protective substrate the benefit of the interference filter is realized in a ballistic protective laser shield. When adding the absorption dyes to provide a hybrid filter incorporating both interference and absorption type filters in a ballistic protective laser shield greater visual transmission is provided than would be obtained using an absorption type filter and the use of either filter or both does not impair the ballistic protection provided. In addition the assembly, whether containing the hybrid or a single interference filter is chemically stable in a non toxic assembly which will not harm the viewer. The invention also makes it feasible to add multiple layer rejection lines in the visible spectrum from 400 to 700 nm and still have usable vision. There is no significant visual transmission loss from the use of an interference filter from 694 to 1064 nm spectral range. Accordingly, the use of the interference filter for the 694 to the 1064 spectral range extends the number of absorption filter lines which can be added to the hybrid filter forming the laser protection shield which still permits a useful level of visual tranmission.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A ballistic protective laser shield for transmitting visible radiation while absorbing and/or reflecting predetermined laser radiation comprising:
    a transparent ballistic protective plastic substrate for transmitting visible radiation,
    an interference filter deposited on a high temperature transparent plastic film which passes normal incidence radiation below 694 nanometers and reflects other wavelengths out to 1064 nanometers regardless of the angle of incidence of the laser radiation applied thereto,
    transparent optical bonding means for bonding said interference filter directly onto said transparent ballistic protective plastic substrate thereby providing a protective laser shield having ballistic protection properties as well as laser radiation rejection properties.

2. The protective laser shield as claimed in claim 1 wherein said ballistic protective plastic substrate comprises polycarbonate.

3. A ballistic protective laser shield for transmitting visible radiation while absorbing and/or reflecting predetermined laser radiation comprising:
    a transparent ballistic protective plastic substrate for transmitting visible radiation,
    an interference filter deposited on a high temperature transparent plastic film which passes normal incidence radiation below 694 nanometers and reflects other wavelengths out to 1064 nanometers regardless of the angle of incidence of the laser radiation applied thereto,
    transparent optical bonding means for bonding said interference filter directly onto said transparent ballistic protective plastic substrate thereby providing a protective laser shield having ballistic protection properties as well as laser radiation rejection properties,
    wherein at least one absorbing dye is incorporated in said plastic substrate for absorbing laser radiation in the region of high eye sensitivity from 400 to 700 nanometers.

4. The protective laser shield as claimed in claim 3 wherein said absorbing dye comprises platinum octaethylporphyrin.

5. A ballistic protective laser shield for transmitting visible radiation while absorbing and/or reflecting predetermined laser radiation comprising:
    a transparent ballistic protective plastic substrate of polycarbonate for transmitting visible radiation,
    an interference filter deposited on a high temperature transparent plastic film which passes normal incidence radiation below 694 nanometers and reflects other wavelengths out to 1064 nanometers regardless of the angle of incidence of the laser radiation applied thereto,
    transparent optical bonding means for bonding said interference filter directly onto said transparent ballistic protective plastic substrate thereby providing a protective laser shield having ballistic protection properties as well as laser radiation rejection properties,
    having at least one absorbing dye incorporated in said polycarbonate substrate for absorbing laser radiation in the region of high eye sensitivity from 400 to 700 nanometers.

6. The method of making transparent protective laser shield which transmits visible radiation while absorbing and/or reflecting predetermined laser radiation the steps of:
    preforming a high temperature transparent plastic film into a configuration desired for the protective laser shield,
    depositing a plurality of thin films of alternatively high and low dielectric materials onto said preformed transparent plastic film forming an interference filter thereon having a low pass characteristic passing normal incident wavelengths below 694 nanometers and reflecting other wavelengths between 694 and 1064 nm, preforming a transparent ballistic protective substrate having a complementary configuration to said preformed transparent plastic film on which said interference film has been deposited, optically bonding said plastic film containing said interference filter to said ballistic substrate for providing a laser shield which protects the viewer ballistically as well as from laser radiation.

7. The method of making transparent protective laser shield which transmits visible radiation while absorbing and/or reflecting predetermined laser radiation the steps of:

preforming a high temperature transparent plastic film into a configuration desired for the protective laser shield, depositing a plurality of thin films of alternatively high and low dielectric materials onto said preformed transparent plastic film forming an interference filter thereon having a low pass characteristic passing normal incident wavelengths below 694 nanometers and reflecting other wavelengths between 694 and 1064 nms, preforming a transparent ballistic protective substrate having a complementary configuration to said preformed transparent plastic film on which said interference film has been deposited, optically bonding said plastic film containing said interference filter to said ballistic substrate for providing a laser shield which protects the viewer ballistically as well as from laser radiation, and forming an absorption filter for wavelengths below 694 nm which are not angle sensitive by incorporating at least one specific laser absorbing chromophore dye into said ballistic protective substrate.

* * * * *